United States Patent
Hayasaka et al.

(10) Patent No.: US 7,881,836 B2
(45) Date of Patent: Feb. 1, 2011

(54) TIRE STATE MONITORING APPARATUS

(75) Inventors: Satoshi Hayasaka, Miyagi-ken (JP); Kenichi Tamagawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 731 days.

(21) Appl. No.: 11/925,131

(22) Filed: Oct. 26, 2007

(65) Prior Publication Data
US 2008/0103654 A1 May 1, 2008

(30) Foreign Application Priority Data
Oct. 26, 2006 (JP) ................ 2006-290680

(51) Int. Cl.
*G01M 17/02* (2006.01)
*G01S 13/74* (2006.01)
*B60C 23/00* (2006.01)

(52) U.S. Cl. .................. 701/29; 342/42; 116/34; 73/146.2

(58) Field of Classification Search .......... 701/32
See application file for complete search history.

(56) References Cited

U.S. PATENT DOCUMENTS

| | | | | |
|---|---|---|---|---|
| 5,235,850 A | * | 8/1993 | Schurmann | 73/146.5 |
| 5,513,525 A | * | 5/1996 | Schurmann | 73/146.5 |
| 6,591,671 B2 | * | 7/2003 | Brown | 73/146.5 |
| 6,931,923 B2 | * | 8/2005 | Katou et al. | 73/146.5 |
| 6,940,940 B2 | * | 9/2005 | Kranz | 377/24.1 |
| 7,243,534 B2 | * | 7/2007 | Ogawa | 73/146 |
| 7,271,733 B2 | * | 9/2007 | Nicot et al. | 340/825.49 |
| 7,696,902 B2 | * | 4/2010 | Ichikawa et al. | 340/870.07 |
| 2001/0008083 A1 | * | 7/2001 | Brown | 73/146 |
| 2004/0206168 A1 | * | 10/2004 | Katou et al. | 73/146 |
| 2005/0057346 A1 | * | 3/2005 | Ogawa | 340/438 |
| 2005/0110626 A1 | * | 5/2005 | Nicot et al. | 340/445 |
| 2007/0080795 A1 | * | 4/2007 | Ichikawa et al. | 340/447 |
| 2008/0272900 A1 | * | 11/2008 | Schillinger et al. | 340/447 |

* cited by examiner

*Primary Examiner*—Thomas G Black
*Assistant Examiner*—Shelley Chen
(74) *Attorney, Agent, or Firm*—Brinks Hofer Gilson & Lione

(57) ABSTRACT

There is provided a tire state monitoring apparatus including transponders mounted on a plurality of tires possessed by a vehicle, and ECUs provided on a vehicle body repeatedly transmit address electric waves for acquiring data showing tire states to the transponders at fixed intervals. The ECUs transmit estimates of the transmission timing of the address electric waves at the predetermined transmission cycle so that the transponders can transmit the address electric waves within a communicable range, maintain the predetermined transmission cycle if the estimated transmission timing satisfies a predetermined condition, and adjust the predetermined transmission cycle if the transmission timing does not satisfy the predetermined condition.

6 Claims, 9 Drawing Sheets

FIG. 10A

| | NUMBER OF ROTATIONS | ANGLE | | NUMBER OF ROTATIONS | ANGLE | | NUMBER OF ROTATIONS | ANGLE |
|---|---|---|---|---|---|---|---|---|
| θ(0) | 0 | 179 | θ(1) | 0 | 358 | θ(2) | 1 | 177 |
| θ(4) | 2 | 175 | θ(5) | 2 | 354 | θ(6) | 3 | 173 |
| θ(8) | 4 | 171 | θ(9) | 4 | 350 | θ(10) | 5 | 169 |
| θ(12) | 5 | 167 | θ(13) | 5 | 346 | θ(14) | 6 | 165 |
| θ(16) | 7 | 163 | θ(17) | 7 | 342 | θ(18) | 8 | 161 |
| θ(20) | 9 | 159 | θ(21) | 9 | 338 | θ(22) | 10 | 157 |

| | NUMBER OF ROTATIONS | ANGLE |
|---|---|---|
| θ(3) | 1 | 356 |
| θ(7) | 3 | 352 |
| θ(11) | 5 | 348 |
| θ(15) | 6 | 344 |
| θ(19) | 8 | 340 |
| θ(23) | 10 | 338 |

FIG. 10B

| | NUMBER OF ROTATIONS | ANGLE | | NUMBER OF ROTATIONS | ANGLE | | NUMBER OF ROTATIONS | ANGLE |
|---|---|---|---|---|---|---|---|---|
| θ(0) | 0 | 165 | θ(1) | 0 | 330 | θ(2) | 1 | 135 |
| θ(4) | 2 | 105 | θ(5) | 2 | 370 | θ(6) | 3 | 75 |
| θ(8) | 4 | 45 | θ(9) | 4 | 210 | θ(10) | 5 | 15 |
| θ(12) | 5 | 345 | θ(13) | 6 | 150 | θ(14) | 6 | 315 |
| θ(16) | 8 | 285 | θ(17) | 9 | 90 | θ(18) | 9 | 255 |
| θ(20) | 10 | 225 | θ(21) | 11 | 30 | θ(22) | 11 | 195 |

| | NUMBER OF ROTATIONS | ANGLE |
|---|---|---|
| θ(3) | 1 | 300 |
| θ(7) | 3 | 240 |
| θ(11) | 5 | 180 |
| θ(15) | 7 | 120 |
| θ(19) | 10 | 60 |
| θ(23) | 12 | 0 |

TIRE STATE MONITORING APPARATUS

RELATED APPLICATIONS

This application claims the benefit of priority under 35 U.S.C. §119 to Japanese Patent Application No. 2006-290680 filed Oct. 26, 2006, which is hereby incorporated by reference.

BACKGROUND

1. Technical Field

The present invention relates to a tire state monitoring apparatus that monitors the state of tires, and in particular, to a tire state monitoring apparatus that can monitor a state, such as the air pressure of tires used for automobiles, etc.

2. Description of the Related Art

Conventionally, in order to enhance the safety during traveling in a vehicle, such as automobiles, tire state monitoring apparatuses that monitor a state, such as the air pressure of each of the tires have been developed. For example, a tire state monitoring apparatus in which four tires of a vehicle are provided with transponders, respectively, four antennas corresponding to the transponders and one transceiver connected to these antennas are provided on the vehicle side, and the number of times of transmitting an address electric wave to each of the transponders is increased or reduced according to the speed of the vehicle is suggested for example, in U.S. Pat. No. 6,931,923. In the tire state monitoring apparatus disclosed in U.S. Pat. No. 6,931,923, an angle within which transmission and reception can be reliably made between the antennas of the transceivers and the transponders is limited, and the angle is a total of 90° including 45° on the right and left sides towards an antenna of the transceiver from the center of a tire. Thus, the number of times of transmitting an address electric wave to a transponder is increased or reduced so that transmission and reception can be made within this angle. According to this tire state monitoring apparatus, it is possible to reliably monitor the state of tires irrespective of the speed of vehicle.

In a conventional tire state monitoring apparatus disclosed in U.S. Pat. No. 6,931,923, as a basic technical idea, the time during which transmission and reception can be made according to the speed of a vehicle is determined from the angle within which transmission and reception can be made, this time is divided by the time that is taken for a tire to make one rotation, and the number of times of wireless transmission while the tire makes one rotation is determined. If the number of times is not an integer, it is carried and obtained as an integer. Meanwhile, in such a conventional technique, the number of times obtained becomes an integer according to a vehicle speed, without being carried. In this case, the interval time of transmission according to the number of times obtained will coincide with the time during which transmission and reception can be made. In this case, although rare, the boundary of the above angle within transmission and reception can be made, and the timing of transmission might be synchronized with each other. Although depending on the determination reference of the angle within which transmission and reception can be made, when it is considered that the number of times of transmission is made as small as possible, this angle becomes wide over the ability of communication sensitivity of an apparatus. In that case, since transmission and reception becomes unstable in a boundary portion of the angle, the aforementioned synchronization phenomenon will hinder stable transmission and reception. Further, if the angle is set narrow over the ability of an apparatus in order to ensure transmission and reception, the number of times of transmission increases. As a result, it is necessary to enhance the communication performance of an apparatus. Even if the number of times of transmission does not become an integer, the same phenomenon occurs with some difference in degree if the number of times of communication is close to an integer. In the above conventional technique, since the number of times of transmission in one rotation of a tire increases if the speed of a vehicle becomes high, the transmission intervals become short beyond the communication ability of an apparatus. Therefore, if the speed of the vehicle exceeds 100 km/h, a separate method is adopted.

As described above, the conventional tire state monitoring apparatus has a disadvantage in that the transmission interval and the angle within which transmission and reception can be made is synchronized with each other depending on the speed of a vehicle. Further, since the number of times of transmission while the tire makes one rotation is increased by shortening the time intervals at which address electric waves are transmitted as the speed of the vehicle becomes high, a processor capable of coping with high-speed processing according to the maximum number of times of the address electric waves should be built in. As a result, there is the disadvantage that the cost required for manufacturing such an apparatus becomes high.

SUMMARY

According to the disclosed tire state monitoring apparatus, a controller transmits an address electric wave at a predetermined transmission cycle, estimates transmission timing according to the speed of the vehicle, and adjusts the transmission cycle of the address electric wave only when the transmission cycle does not satisfy a predetermined condition. Therefore, unlike the conventional tire state monitoring apparatus, it is possible to avoid a situation where the number of times of transmission of address electric waves is rapidly increased uniformly according to vehicle speed, and it becomes unnecessary to mount a processor capable of coping with high speed processing. As a result, it is possible to properly monitor the state of a tire even if the speed of a vehicle becomes high, while reducing the cost required for manufacture of an apparatus body.

In one embodiment of the disclosed tire state monitoring apparatus, the predetermined condition is such that target transmission timing that is transmission timing directly before or directly after one rotation of the tire from the starting point of the transmission cycle is located within a prescribed reference angle range. The angle (hereinafter referred to as evaluation angle) that is formed between the starting point of the transmission cycle and the target transmission timing is located within a prescribed reference angle range is set as a predetermined condition. If this condition is satisfied, the evaluation angle becomes the movement angle, or the angle between transmission timings, i.e., the relation between the transmission cycle and the movement angle becomes proper. As a result, the transmission timing can be located within the communicable range necessarily once while the tire makes a plurality of rotations. Accordingly, in this case, if an address electric wave is transmitted at a predetermined transmission cycle, communication is established.

For example, in the above tire state monitoring apparatus, the prescribed reference angle is set to an angle position that is narrower than a communicable angle range that sandwiches a reference position of almost a half angle position of the communicable angle range. Accordingly, since the movement angle is set to the center of the communicable angle range excluding both ends thereof, the possibility that the transmission timing falls within the communicable range by a plurality of rotations of a tire will increase.

BRIEF DESCRIPTION OF THE DRAWINGS

FIGS. 10A and 10B are views showing the transmission timing of address electric waves before and after adjustment, in the tire state monitoring apparatus according to the above embodiments.

DESCRIPTION OF THE EMBODIMENTS

The invention has been made by paying attention to the fact that there is transmission timing that moves by the same angle for every one rotation of a tire in a case where a transmission cycle (transmission interval) is large, in a tire state monitoring apparatus that transmits address electric waves to a transponder from a vehicle-side controller, and by paying attention to the fact that, if this angle (referred to as movement angle) is proper compared with an angle of a communicable angle range, the transmission timing falls within the communicable range during a plurality of rotations. Also, the invention is a tire state monitoring apparatus that estimates the transmission timing according to the speed of a vehicle, that checks whether or not the transmission timing meets a predetermined condition, i.e., a condition for determining whether or not the above movement angle is proper compared with an angle of the communicable angle range, that does not adjust the transmission cycle particularly if the transmission timing satisfies the predetermined condition, or shifts the transmission timing to adjust the transmission cycle so that the movement angle may fall within the proper range, if the transmission timing does not satisfy the predetermined condition.

Although there are various embodiments about the estimation and adjustment of the transmission timing, the basic concept of the invention is that, if prescribed conditions are satisfied, the transmission cycle is not changed, and if not, the transmission cycle is changed and adjusted.

In the invention, it is not intended that the transmission timing necessarily falls within a communicable range during one rotation of a tire, unlike the conventional technique. Although the possibility that the transmission timing falls within the communicable range during one rotation of the tire is rapidly increased by the invention, it is intended that the transmission timing falls within the communicable range at least once during a plurality of rotations of the tire.

Hereinafter, one embodiment of the invention will be described in detailed with reference to the accompanying drawings.

Figure 1:
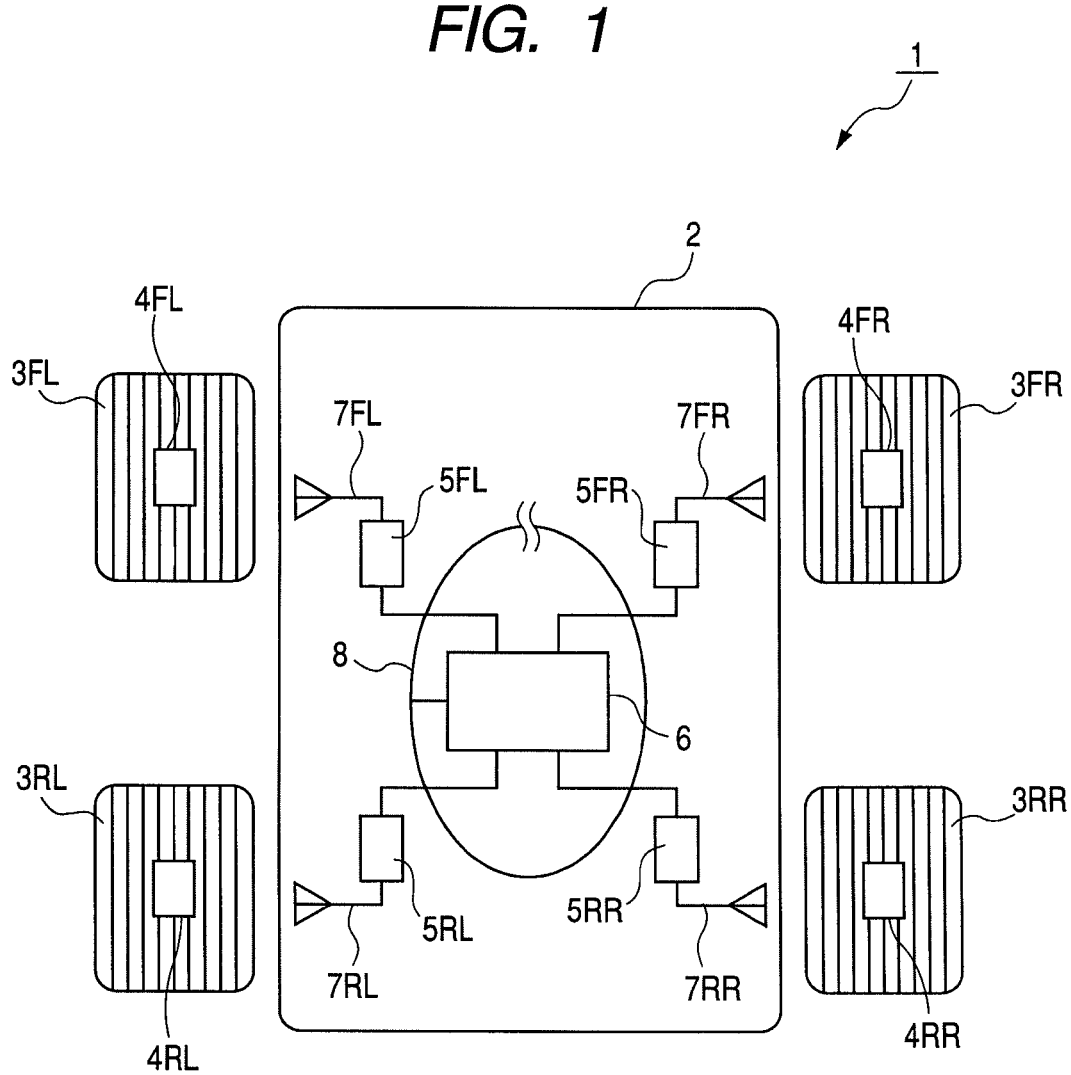
FIG. 1 is a schematic view for explaining the whole configuration of a tire state monitoring apparatus according to an embodiment.
Figure 2:
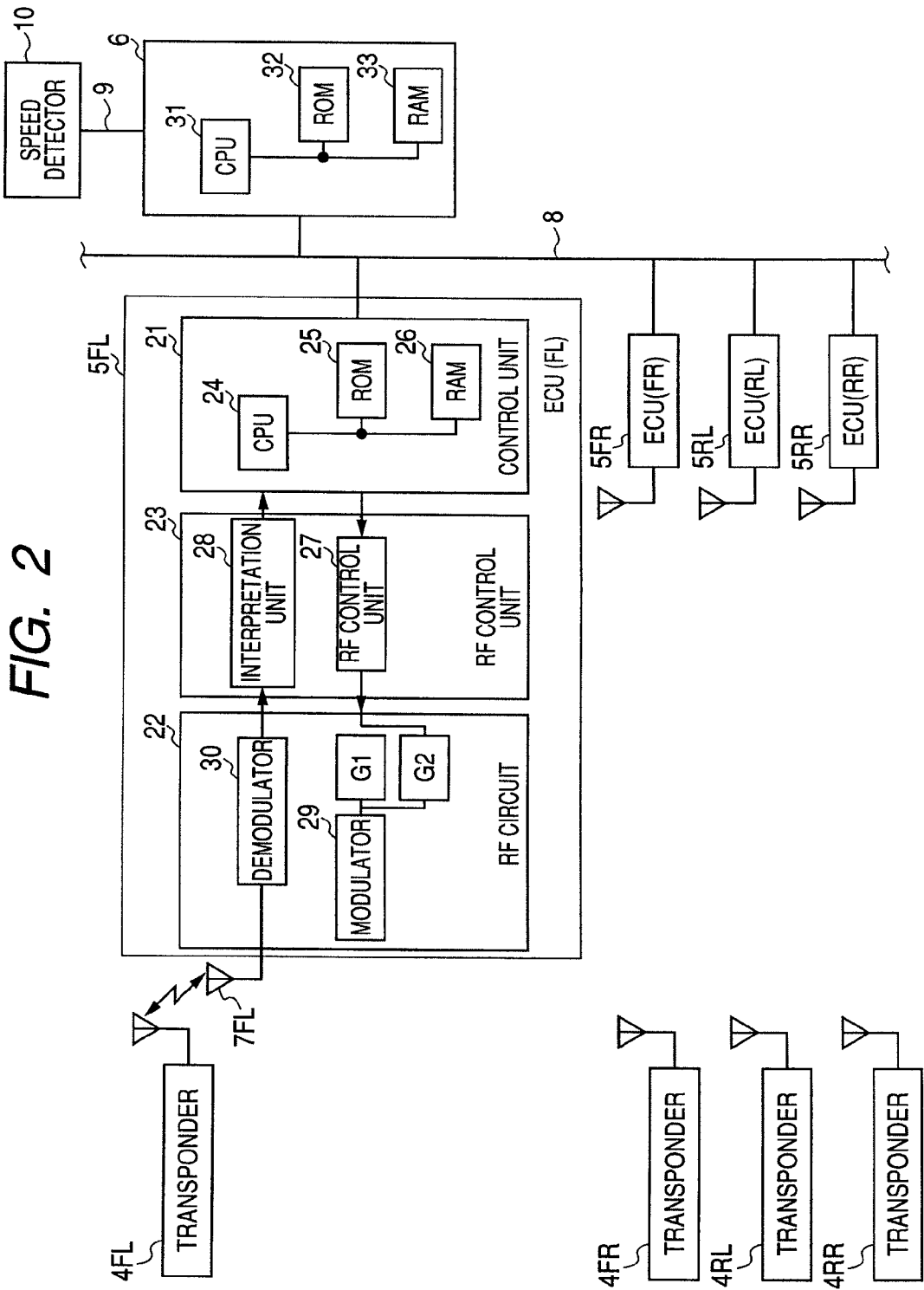
FIG. 2 is a functional block diagram for explaining the configuration of ECUs possessed by the tire state monitoring apparatus according to the above embodiment.

FIG. 1 is a schematic view for explaining the whole configuration of a tire state monitoring apparatus according to an embodiment. In addition, in FIG. 1, the upper side shown in this figure is defined as the front side of a vehicle, and the lower side in this figure is defined as the rear side of the vehicle. FIG. 2 is a functional block diagram for explaining a detailed configuration of the tire state monitoring apparatus 1 according to the embodiment shown in FIG. 1.

As shown in FIG. 1, the tire state monitoring apparatus 1 according to the present embodiment includes transponders 4FL to 4RR respectively mounted on tires 3FL to 3RR constituting front, rear, right, and left wheels (front left wheel: FL, front right wheel: FR, rear left wheel: RL, and rear right wheel: RR) of a vehicle 2, such as automobiles, electronic control units (ECU) 5FL to 5RR provided on the side of the vehicle 2 in correspondence with these transponders 4FL to 4RR, and a master ECU 6 connected via these electronic control units 5FL to 5RR and bus 8. The electronic control units 5FL to 5RR include antennas 7FL to 7RR used for communication with the corresponding transponders 4FL to 4RR, respectively. In addition, the ECUs 5FL to 5RR function as controllers.

As shown in FIG. 1, the individual transponders 4FL to 4RR are configured so as to measure the states (hereinafter, appropriately referred to as "tire state") of the corresponding tires 3FL to 3RR, specifically, the air pressures of the corresponding tires 3FL to 3RR, and to wirelessly transmit tire state data including the air pressure data obtained as the results of the measurement to the corresponding ECUs 5FL to 5RR. As shown in FIG. 2, each of the transponders 4FL to 4RR generates induced power on the basis of an address electric wave from each of the ECUs 5FL to 5RR, as will be describe later, measures tire state data using the induced power, and wirelessly transmits the tire state data to each of the ECUs 5FL to 5RR.

For example, each of the transponders 4FL to 4RR includes a pressure sensor that measures each of the tires 3FL to 3RR, and a resonator whose resonant frequency varies according to the air pressure measured by the pressure sensor. If a resonator resonates at a resonant frequency according to the current air pressure, according to an address electric wave from each of the ECUs 5FL to 5RR, a signal at this resonant frequency is wirelessly transmitted to a corresponding one of the ECUs 5FL to 5RR, as tire state data.

In addition, in the present embodiment, although the case in which the individual transponders 4FL to 4RR measure the air pressures of the corresponding tires 3FL to 3RR as tire states is described, a target to be measured as a tire state is not limited thereto, and can be changed appropriately. For example, the temperature, etc. of a tire may be measured.

As shown in FIG. 2, the individual ECUs 5FL to 5RR are connected to the master ECU 6 via the bus 8 that are serially communicable. The master ECU 6 is connected to a detecting unit that detects various kinds of information in the vehicle 2 via bus 9 that are serially communicable similarly to the above. In the present embodiment, as described above, a case in where the master ECU is connected to a speed detector 10 that detects the traveling speed of the vehicle 2 in order to make vehicle speed data included in a driving signal will be described.

The bus 8 is constructed using, for example, LIN (Local Interconnect Network), and the bus 9 is constructed using, for example, CAN (Controller Area Network). In this way, by constructing a network between the individual ECUs 5FL to 5RR and the master ECU 6 with LIN, and constructing a network between the master ECU 6 and the speed detector 10 with CAN, low-cost connection between the master ECU 6 and the individual ECUs 5FL to 5RR is enabled, and high real-time processing between the master ECU 6 and the speed detector 10 is enabled.

The master ECU 6 includes, for example, a CPU 31 that performs the whole control of the master ECU 6, and a ROM 32 and a RAM 33 that are connected to the CPU 31. A control program that is read by the CPU 31 and used to perform control of the master ECU 6 is recorded in the ROM 32. The RAM 33 is used as a work area when the control program in the ROM 32 is executed. For example, a control program that transmits a driving signal used as a reference for the timing with which each of the ECUs 5FL to 5RR transmits an address electric wave is recorded in the ROM 32.

In the present embodiment, the master ECU 6 makes the vehicle speed data of the vehicle 2 detected by the speed detector 10 included in the driving signal. By making the vehicle speed data included in the driving signal in this way, in each of the ECUs 5FL to 5RR, it is possible to adjust the transmission timing of the address electric wave according to the vehicle speed data. The master ECU 6 transmits the driving signal to each of the ECUs 5FL to 5RR, and acquires information, such as the air pressure of each of the tires 3FL to 3RR, which is calculated by each of the ECUs 5FL to 5RR.

Although only the functional block of the ECU 5FL is shown in FIG. 2, the functional blocks of the other ECUs 5FR to 5RR are also similar to the functional block of the ECU 5FL.

The ECU 5FL includes a control unit 21 that controls the whole control of the ECU 5FL, an RF circuit 22 that performs wireless communication with the transponder 4FL via the antenna 7FL, and an RF communication unit 23 that controls the RF circuit 22 according to an instruction from the control unit 21, and interprets a signal from the RF circuit 22.

The control unit 21 includes, for example, a CPU 24 that performs the whole control of the ECU 5FL, and a ROM 25 and a RAM 26, which are connected to the CPU 24. A control program that is read by the CPU 24 and used to perform control of the ECU 5FL is recorded in the ROM 25. The RAM 26 is used as a work area when the control program in the ROM 25 is executed.

In particular, a control program that transmits an address elective wave to the transponder 4FL according to a driving signal from the master ECU 6 is written in the ROM 25. This control program is set such that an address electric wave is transmitted after a fixed stand-by time has lapsed from when the driving signal from the master ECU 6 has been received.

Here, as for the stand-by time that is taken until an address electric wave is transmitted, different stand-by time is set by each of the ECUs 5FL to 5RR. Specifically, stand-by time of 0 ms is set in the ECU 5FL, stand-by time of 5 ms is set in the ECU 5FR, and stand-by time of 10 ms is set in the ECU 15RR. In this way, a different stand-by time is set by each of the ECUs 5FL to 5RR in order to prevent the tire state data that are wirelessly transmitted from the transponders 4FL to 4RR from interfering with one another.

Further, as will be described later, a control program that adjusts a cycle at which an address electric wave is transmitted to the transponder 4FL according to the data (hereinafter referred to as "vehicle speed data") showing the speed (vehicle speed) of the vehicle 2 included in a driving signal is written in the ROM 25. Specifically, a control program that adjusts the transmission cycle of an address electric wave so that the address electric wave can be transmitted to the communicable range of the transponder 4FL according to vehicle speed data is written. In addition, the control for adjusting the transmission cycle of this address electric wave will be described later.

The RF communication unit 23 includes an RF control unit 27 that receives a control parameter transferred from the control unit 21, and control the RF circuit 22 according to the content of the control parameter, and an interpretation unit 28 that interprets the content of a signal (demodulated signal) demodulated by the RF circuit 22, and outputs frequency data (resonant frequency data) to the control unit 21.

The RF circuit 22 includes a carrier wave oscillator G1 that generates a carrier wave, a modulation wave oscillator G2 that generates a modulation wave (modulation signal) used for modulation of the carrier wave, a modulator 29 that modulates the carries wave with the modulation wave, and a demodulator 30 that demodulates the modulation signal from the transponder 4FL. The modulation wave oscillator G2 generates a modulation wave of a frequency around the resonant frequency of a resonator possessed by the transponder 4FL. The carrier wave modulated by such a modulation wave is transmitted to the transponder 4FL via the antenna 7FL.

Here, the antenna 7FL is connected to the RF circuit 22 via a coaxial cable. In the tire state monitoring apparatus 1 according to the present embodiment, the ECU 5FL is disposed in the vicinity of the tire 3FL unlike a conventional tire state monitoring apparatus. Therefore, the antenna 7FL is connected to the RF circuit 22 using a relatively short coaxial cable. For this reason, the cost required for the coaxial cable can be reduced, compared with the conventional tire state monitoring apparatus.

If the tire state of the tire 3FL is monitored in such an ECU 5FL, a carrier wave modulated by a modulation wave from the modulation wave oscillator G2 is transmitted to the transponder 4FL from the RF circuit 22 during predetermined duration, and thereafter, and a non-modulated carrier wave is transmitted to the transponder 4FL during predetermined duration. In addition, a continuous wave of the carrier wave modulated by the modulation wave in this way, and the non-modulated carrier wave functions as an address electric wave.

If a resonator possessed by the transponder 4FL resonates according to the modulated carrier wave, the RF circuit 22 receives a signal (re-modulation signal) modulated at a resonant frequency from the transponder 4FL during transmission duration of a non-modulated carrier wave. After this re-modulation signal is demodulated by the demodulator 30 is output to the interpretation unit 28. Then, after the content of this demodulated signal is interpreted by the interpretation unit 28, it is output to the control unit 21 as frequency data (resonant frequency data).

If the control unit 21 receives this frequency data, it determines the resonant frequency of a resonator possessed by the transponder 4FL from the frequency data, and grasps the air pressure of the tire 3FL on the basis of this resonant frequency. Then, the data showing the air pressure of the tire is output to the master ECU 6. In addition, when the air pressure of the tire 3FL is grasped in the control unit 21, it is preferable to grasp the air pressure of the tire 3FL by referring to a table in which resonant frequencies and air pressures of the tire 3 are made to correspond to each other.

Figure 3:
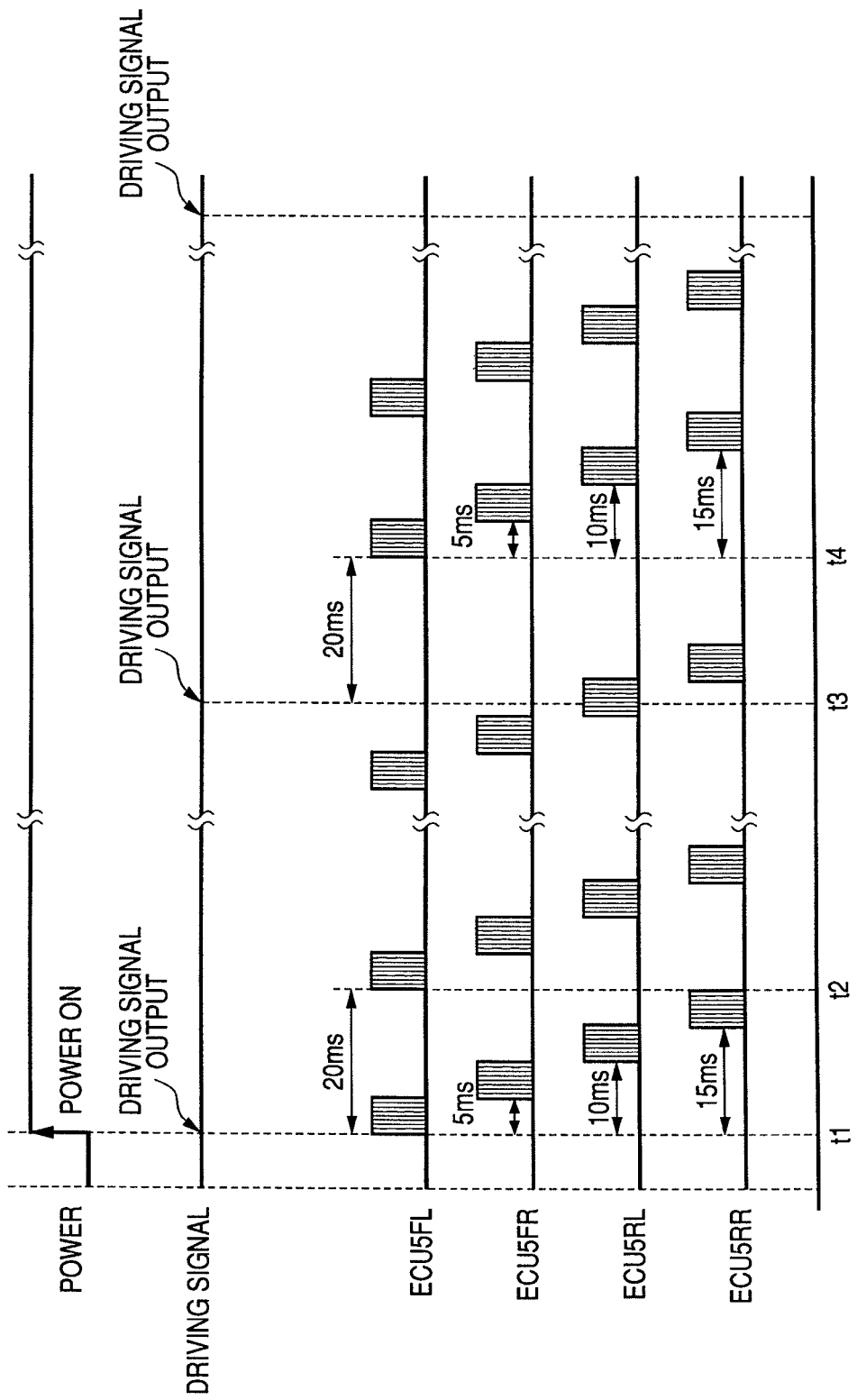
FIG. 3 is a sequence view for explaining the operation when the tire state of each of tires to is monitored in the tire state monitoring apparatus according to the above embodiment.

Next, in the tire state monitoring apparatus 1, the operation when the tire state of each of the tires 3FL to 3RR is monitored will be described with reference to FIG. 3. FIG. 3 is a sequence view for explaining the operation when the tire state of each of the tires 3FL to 3RR is monitored in the tire state monitoring apparatus 1 according to the present embodiment. In addition, FIG. 3 shows the operation when the tire state of each of the tires 3FL to 3RR is monitored from when the power of the vehicle 2 is turned on by an ignition switch.

As shown in FIG. 3, at a point of time t1, if the power of the vehicle 2 is turned on by the ignition switch, a first driving signal is output to the individual ECUs 5FL to 5RR from the master ECU 6. If the driving signal is received, the individual the ECUs 5FL to 5RR transmits an address electric wave to the corresponding transponders 4FL to 4RR after predetermined stand-by time allocated thereto has lapsed. Although the cases where vehicle speed data is included or not included in the first driving signal output at the turn-on of the ignition switch are considered, a case where vehicle speed data is not included will be described in the following description. This is because a normal vehicle is in a stopped state directly after the ignition switch is turned on, and thus, the vehicle speed is 0 km/h, and there is no influence of the vehicle speed. Of course, it is also possible to output a driving signal including vehicle speed data after the master ECU 6 has obtained the vehicle speed data. In this case, it is desirable that the following process be modified a little.

If the ECU 5FL receives a final driving signal, it transmits an address electric wave after stand-by time of 0 ms has lapsed, that is, with no stand-by time. Similarly, the ECUs 5RL and 5RR transmit address electric waves after stand-by times of 10 ms and 15 ms have lapsed, respectively. As shown in FIG. 3, the time during which each of the ECUs 5FL to 5RR transmits an address electric wave is 5 ms. Accordingly, the time from when the ECU 5FL has started transmission of an address electric wave to when the ECU 5RR has completed transmission of an address electric wave is 20 ms.

After the final driving signal is received, each of the ECUs 5FL to 5RR transmits an address electric wave again after 20 ms that is a reference transmission cycle from when an address electric wave has been transmitted previously, excluding a case where it has received another driving signal, has lapsed. For example, in a case where the ECU 5FL does not receive another driving signal from the master ECU 6, it transmits an address electric wave again at a point of time t2 that is a point of time after 20 ms has lapsed from the point of time t1. This is the same in the other ECUs 5FR to 5RR. The reference transmission cycle of 20 ms functions as a predetermined transmission cycle in the claims. Although the reference transmission cycle is determined as a shorter cycle in a range in which an excessive burden is not laid on the apparatus, it is also possible to select a still shorter cycle according to an improvement in performance of an apparatus. A longer cycle may be adopted depending on an environment in which a vehicle is used.

On the other hand, in a case where another driving signal has been received from the master ECU 6, after lapses of 20 ms from that point of time, the individual ECUs 5FL to 5RRs transmits an address electric wave to the corresponding transponders 4FL to 4RR after the stand-by time allocated thereto has lapsed. For example, in a case where another driving signal has been received from the master ECU 6 at a point of time t3, the individual ECUs 5FL to 5RR transmits an address electric wave to the corresponding transponders 4FL to 4RR after the stand-by time allocated thereto has lapsed from a point of time t4 that is a point of time after 20 ms has lapsed from the point of time t3. Then, each of the ECUs 5FL to 5RR repeatedly performs the succeeding transmission of an address electric wave according to a transmission cycle adjusted by the adjustment control as will be described later.

In addition, in a case where any one of the ECUs 5FL to 5RR receives an address electric wave when another driving signal has been received from the master ECU 6, processing is continued until the ECU 5RR that finally transmits an address electric wave completes its transmission processing, and the transmission processing of an address electric wave in each of the ECUs 5FL to 5RR will not be stopped.

Further, although in the above description, the time that is taken until the first ECU 5FL transmits an address electric wave from when another driving signal has been received from the master ECU 6 is set to be 20 ms, an adjusted transmission cycle may be applied from this time if the processing performance of an apparatus is satisfactory. In this case, communication according to a vehicle speed can be made from an earlier stage.

In the tire state monitoring apparatus 1 according to the present embodiment, as described above, the transmission cycle (hereinafter sometimes simply referred to as "transmission cycle") of an address electric wave by the ECUs 5FL to 5RR is adjusted according to the vehicle speed data included in a driving signal from the master ECU 6. Specifically, the ECUs 5FL to 5RR performs control of adjusting the transmission cycle of an address electric wave according to the vehicle speed data included in a driving signal from the master ECU 6.

Figure 4:
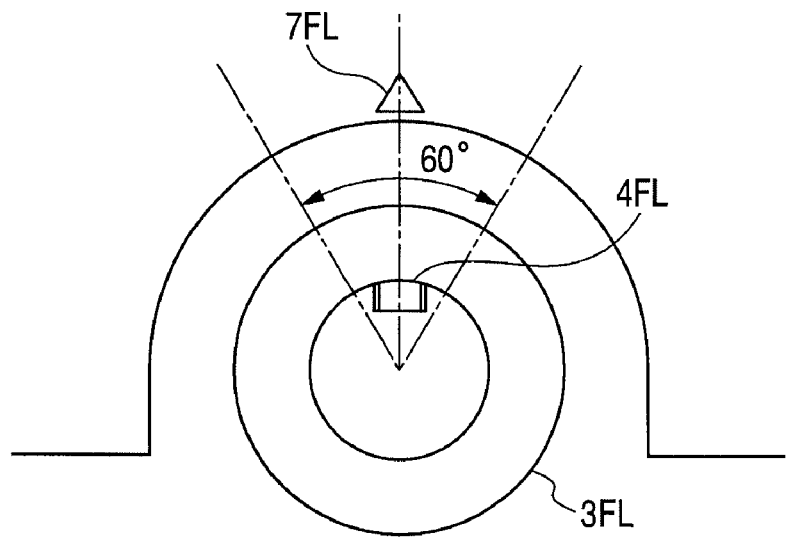
FIG. 4 is a view showing the positional relationship among a transponder mounted on a tire of the tire state monitoring apparatus according to the above embodiment, and an antenna of a controller.

Here, the control of adjusting the transmission cycle of an address electric wave in the ECUs 5FL to 5RR will be described. FIG. 4 is a view showing the positional relationship among a transponder 4 mounted on a tire 3 of the tire state monitoring apparatus 1 according to the present embodiment, and an antenna 7 of a controller 5, and FIGS. 5 and 6 are schematic views for explaining the control of adjustment of a transmission cycle of the tire state monitoring apparatus 1 according to the present embodiment.

In the tire state monitoring apparatus 1 according to the present embodiment, the transponder 4 mounted on the tire 3 has a communicable angle range in which it can effectively performs wireless communicate with the ECU 5. This is because communication becomes unstable and consequently impossible if the distance between the ECU 5 and the transponder 4 increases since communication between the ECU 5 and the transponder 4 is performed by a weak electric wave. As shown in FIG. 4, in the present embodiment, the communicable range is set to a total range of 60°, including 30° on both sides of a normal line that connects the centers of rotation of the antenna 7 and that of the tire 7. Since the antenna 7 and the transponder 4 approach each other if the transponder 4 falls within this range with the rotation of the tire 3, an address electric wave transmitted from the antennas 7 is received by the transponder 4, which allows communication. In addition, communicability changes continuously, and this communicability is not such that communication is allowed or not allowed with a certain angle as a boundary. In the description of the invention, for the sake of convenience, the communicable angle range is adopted as a communicable range. However, opposite points, that is, a −30 position and a +30 position are described as unstable communication points. The above numerical values relating to the communicable range can be changed according to the performance of an apparatus and an environment in which the apparatus is placed. However, even if any change is made, the major point of the control of adjustment of the transmission cycle of the invention can be applied, irrespective of the numerical values.

In the tire state monitoring apparatus 1 according to the present embodiment, the transmission timing of an address electric wave (hereinafter sometimes simply referred to as "transmission timing") is adjusted by adjusting a transmission cycle so that the address electric wave can be transmitted, when the tire 3 rotates and the transponder 4 falls within the communicable range.

Figure 5:
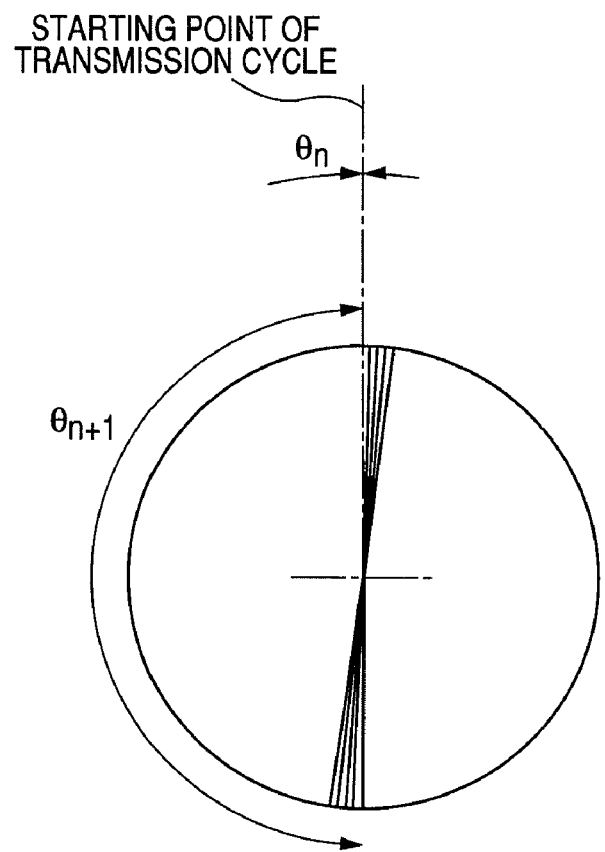
FIG. 5 is a schematic view for explaining the control of adjustment of a transmission cycle of the tire state monitoring apparatus according to the above embodiment.
Figure 6:
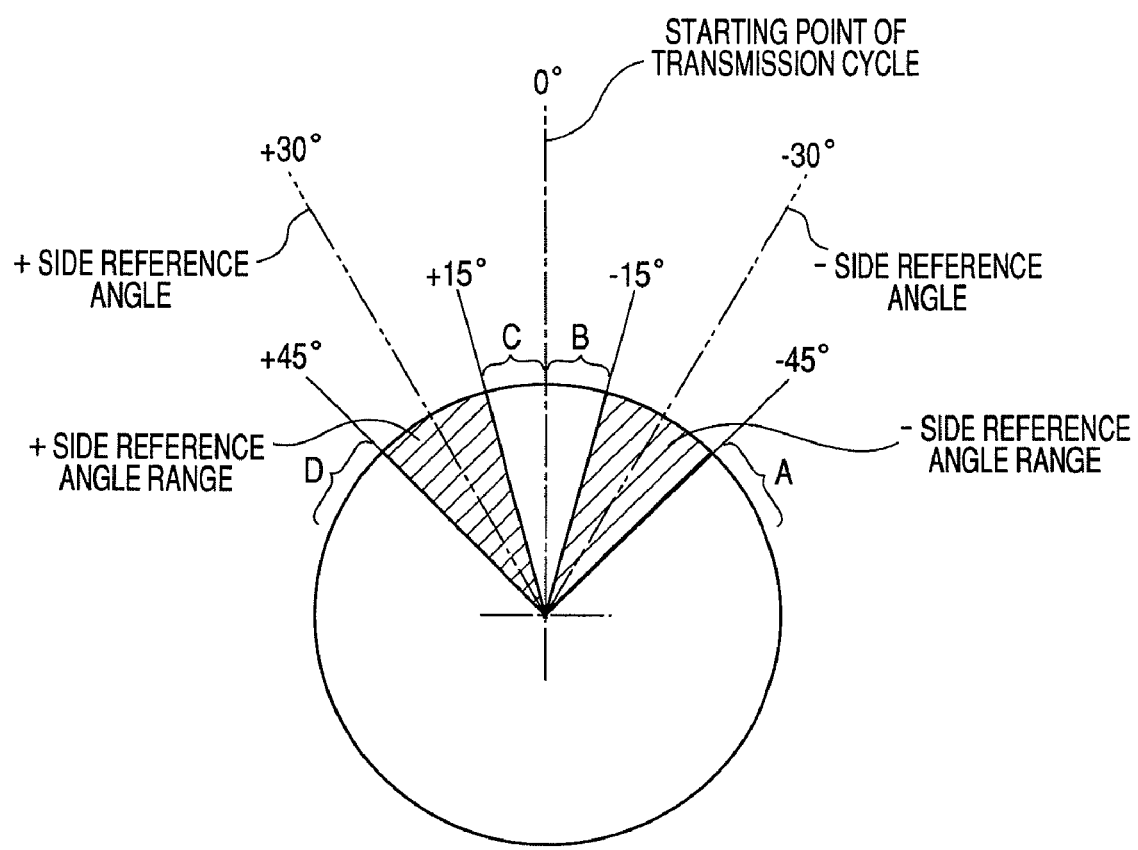
FIG. 6 is a schematic view for explaining the control of adjustment of a transmission cycle of the tire state monitoring apparatus according to the above embodiment.

The transmission timing of an address electric wave in a case where the tire 3 has rotated by certain fixed angles is shown in FIG. 5. In particular, the transmission timing in a case where transmission of an address electric wave is made at a predetermined transmission cycle from a starting point of the transmission cycle is shown in FIG. 5. Here, numbers mean the number of a transmission timing. The starting point of the transmission cycle is a point where the control of the transmission cycle is started. Although this point is timing with which transmission is made, it can also be called transmission timing. In addition, in the following description, the starting point of the transmission cycles is not an actual point of transmission control, but is a calculational point in that the transmission timing is estimated. The transmission point is also a calculational point based on the starting point of an imaginary transmission cycle. The last transmission timing before the tire 3 makes one rotation is called to n-th transmission timing, and the first transmission timing after the tire make one rotation is called (n+1)th transmission timing. In the drawing, the counterclockwise direction is a + direction of the angle.

In FIG. 5, a rotational cycle (T) in the tire 3 that rotates at a certain fixed speed is determined according to the following "Equation 1" where vehicle speed is defined as [km/h], and the diameter of the tire 3 is defined as d[m].

$$T = \frac{d \cdot \pi \cdot 60^2}{v \cdot 10^3}[s] \qquad \text{[Equation 1]}$$

In the tire state monitoring apparatus 1 according to the present embodiment, the ECU 5 transmits an address electric wave to the transponder 4, at a reference transmission cycle of 20 ms. The angle ($\theta$) at which the tire 3 advances during this 20 ms, is determined according to the following [Equation 2]. Further, the angular speed ($\omega$) in this case is determined according to the following [Equation 3].

$$\theta = \frac{360}{T} \cdot \frac{20}{10^3} = \frac{2v}{d \cdot \pi}[°] \qquad \text{[Equation 2]}$$

$$\omega = \frac{360}{T} = \frac{10^2 \cdot v}{d \cdot \pi}[°/s] \qquad \text{[Equation 3]}$$

In a case where the transmission cycle is 20 ms, and the diameter of a tire is 60 cm, if the number of times at which an address electric wave is transmitted before the tire 3 makes one rotation is defined as "n", the number of times (n) is determined according to the following equation.

In a case where the transmission cycle is 20 ms, and the diameter of a tire is 60 cm, if the number of times at which an address electric wave is transmitted before the tire 3 makes one rotation is defined as "n", the number of times (n) is determined according to the following equation.

$$n = \frac{360}{\theta} = \frac{360 \cdot T \cdot 10^3}{360 \cdot 20} = 50T \qquad \text{[Equation 4]}$$

Also, an angle ($\theta_n$) from a starting point of a transmission cycle of n-th transmission timing, and an angle ($\theta_{n+1}$) from a starting point of a transmission cycle of (n+1)-th transmission timing are determined according to the following [Equation 5].

$$\theta_n = 360 - n \cdot \theta[°], \theta_{n+1} = (n+1) \cdot \theta - 360[°] \qquad \text{[Equation 5]}$$

$\theta_n$ is called a first evaluation angle, and $\theta_{n+1}$ is called a second evaluation angle. As for a smaller one of the first evaluation angle and the second evaluation angle, there is a feature that transmission timing appears in positions that are sequentially separated as much as this evaluation angle with rotation of a tire. The transmission timing will move at intervals equivalent to this movement angle with the rotation of the tire. An evaluation angle in this becomes a movement angle.

FIG. 5 shows transmission timing when the vehicle speed is v=168.6 km/h in a case where transmission is performed at a reference transmission cycle of 20 ms in a vehicle having a tire diameter of 60 cm. In this case, the angle $\theta$ becomes 179°, the first evaluation angle ($\theta_{n+1}$) becomes 177°, and the second evaluation angle ($\theta_n$) becomes 2°. Also, with rotation of a tire, the transmission timing moves by the second evaluation angle, i.e., by every 2°. In this case, the second evaluation angle corresponds to a movement angle. Since the movement angle is extremely small, the transmission timing will hardly fall within the communicable range, for example, in a case where the communicable is located directly in the vicinity of the starting point of the transmission cycle in the +direction. The invention solves such a problem by the following adjustment control.

Prior to description of the adjustment control of the tire state monitoring apparatus 1 according to the present embodiment, various setting values used for the control adjustment will be described. FIG. 6 is a view for explaining the above-described reference angle range, the after-mentioned reference angles, and relevant items. A + side reference angle and a – side reference angle are set in opposite positions in the + direction and – direction with the starting point of the transmission cycle being 0°, and a + side reference angle range and a – side reference angle range are set so as to sandwich the reference angles, respectively. The region outside the reference angle ranges are divided into an A region, a B region, a C region, and a D region. In the drawing, the absolute value of the reference angles is set to 3°, and the absolute value of the reference angle ranges is set to 15° to 45°.

These values are used to evaluate the transmission timing and adjust the transmission cycle. The values in the drawings are on the assumption that the communicable angle range 60°. In a case where the communicable angle range is 60°, if the movement angle is 0° or 60°, the boundary portion of the communicable angle range and the transmission cycle might be synchronized with each other. If the movement angle is near 0° (or 60°), they are not synchronized with each other, but a tire is compelled to rotate considerably until the transmission timing falls within the communicable angle range. In order to secure reliable communication, the reference angle ranges are set to a narrower angle compared with the communicable angle range. Further, as described above, the reason why the reference angle ranges becomes narrow is that communication performance is unstable at the ends of the communicable angle range, and vehicle speed always changes in actuality, although the invention has been described that the vehicle speed is constant until vehicle speed data is updated.

If the movement angle falls within the reference angle ranges, it is possible to expect that the transmission timing surely falls within the communicable angle range, even if there is any deviation in environmental conditions, for example, a minute change in the vehicle speed. If the movement angle is in a range of 15° to 45°, the transmission timing deviates by this movement angle at every one rotation of a tire. If the movement angle is 15°, the transmission timing moves by one round at twenty four rotations. As a result, even if the starting point of the transmission cycle is in any position, the transmission timing falls within the communicable angle range at least one time during the twenty four rotations. If the movement range is 45, the transmission timing falls within the communicable angle range at least one time during eight rotations. Of course, these values are the numbers of rotations in a case where the number of rotations becomes the greatest until the transmission timing falls within the communicable range. In many cases, communication can be made at a still fewer number of rotations. These setting values are changed according to the capability of an apparatus, or grasping of critical values by experiments, or according to required performance.

In the adjustment control of the tire state monitoring apparatus 1 according to the present embodiment, first, the transmission timing in a reference transmission cycle is estimated, whether or not the transmission timing satisfies predetermined conditions is determined, the transmission cycle is not adjusted if the conditions are satisfied, and the transmission cycle is adjusted if the conditions are not satisfied. Hereinafter, these steps will be described in order.

[Determination]

The transmission timing of an (n-th) address electric wave directly before a specific number of rotations, that is, the first rotation of a tire, or the transmission timing of an ((n+1)-th) address electric wave directly after the first rotation of the tire is calculated, and whether or not the transmission timing falls within prescribed reference angle ranges is determined. In other words, the first evaluation angle ($\theta_{n+1}$) or second evaluation angle ($\theta_n$) that is an angle that formed by the transmission timing and the starting point of a transmission cycle is found out, and the at least one of these evaluation angles fall within the prescribed reference angle ranges is determined. A − reference angle range corresponds to the n-th transmission timing, and a + reference angle range corresponds to the (n+1)-th reference angle range. Also, if an evaluation angle falls within a corresponding reference range, a predetermined transmission cycle is maintained, and if an evaluation angle does not fall within the transmission cycle, the transmission cycle is adjusted.

The reason why it is desirable that either the n-th transmission timing or the (n+1)-th transmission timing falls within a corresponding prescribed reference angle range is as follows. Referring to FIG. 6, in a case where one transmission timing falls within a corresponding reference angle range, it can be considered that a case where the other transmission timing does not falls within a corresponding reference angle range is a case where the other transmission timing is in the A region or D region, and a case where the other transmission timing is in the B region or C region. In the former case, the evaluation angle (it becomes an angle of 15° to 45°) when one transmission timing falls within a reference angle range becomes a movement angle, and the transmission timing moves at every rotation of a tire, whereby the amount equivalent to one round of a tire is covered by the movement angle during a plurality of rotations. Therefore, the transmission timing falls within a communicable angle range at least one time. In the latter case, since the sum of the evaluation angle $\theta_{n+1}$ and the evaluation angle $\theta_n$, i.e., the angle between transmission timings exceeds 45°, but is smaller than 60° within an the communicable angle range, the transmission timing falls within the communicable range during one round of a tire. Otherwise, the angle between the transmission timings becomes close to 60°, but the movement angle becomes an angle close to 15°. As a result, the transmission timing moves by this movement angle at every rotation of a tire, whereby the amount equivalent to one round of a tire is covered by the movement angle during a plurality of rotations. Therefore, the transmission timing falls within a communicable angle range at least one time. The case where the other transmission timing is in the C region or D region is unstable a little, but is at a level with no hindrance practically.

Among the n-th transmission timing and the (n+1)-th transmission timing, it is possible to perform determination only in one transmission timing. For example, in a case where whether or not the (n+1)-th transmission timing falls within the + reference angle range is determined, even if the n-th transmission timing is in the − reference angle range as compared the aforementioned method, it is not determined that predetermined conditions are satisfied. Accordingly, the next adjustment step will be performed without maintaining a predetermined transmission cycle. As a result, although the adjustment steps increases, the determination steps becomes simple. It is desirable to selectively use these steps depending on the capability, purpose, etc. of an apparatus.

[Adjustment]

In a case where the (n+1)-th transmission timing and the n-th transmission timing falls within the reference angle ranges, the process proceeds to the next step. First, either the (n+1)-th transmission timing and the n-th transmission timing is selected as target transmission timing, and whether or not this target transmission timing is on the + side or − side of a corresponding reference angle range is determined. As for the selection of the target transmission target, although it is more desirable to compare the first evaluation angle $\theta_{n+1}$ and the second evaluation angle $\theta_n$ determined in [Equation 5], and then select smaller transmission timing, an arbitrary one may be determined uniquely.

Case 1: in a case where transmission timing having a smaller evaluation angle is selected as target transmission timing, the target transmission timing is used as transmission timing to be adjusted if the target transmission timing is on the + side of a reference angle range, and the n-th transmission timing is used as transmission timing to be adjusted if the target transmission timing is on the + side of the reference angle range.

Case 2: in a case where the (n+1)-th transmission timing is uniquely selected as target transmission timing, the target transmission timing (=(n+1)-th transmission timing) is used as the transmission timing to be adjusted when it is on the − side of the + side reference angle range.

Case 3: in a case where the n-th transmission timing is uniquely selected as target transmission timing, the target transmission timing (=n-th transmission timing) is used as the transmission timing to be adjusted.

Next, adjustment time is determined from an angle (adjustment angle) between the transmission timing to be adjusted and the + side or − side reference angle, and this adjustment time is added to a reference transmission cycle to determine an adjusted transmission cycle. Otherwise, adjustment time is determined from an angle (adjustment angle) from a reference angle to which the transmission timing to be adjusted is close, and this adjustment time is added to a reference transmission cycle to determine an adjusted transmission angle. In the case, the reference angle becomes a movement angle.

As described above, as for the adjustment control of the tire state monitoring apparatus 1 according to the present embodiment, the (n+1)-th transmission timing and the n-th transmission timing can be selected as target transmission timing. However, the first embodiment where one having a smaller movement angle, of the (n+1)-th transmission timing and the n-th transmission timing, is selected, will be described below. As the reference transmission cycle, tire diameter, and communicable angle range, the aforementioned numerical values are applied.

Embodiment 1

Figure 7:
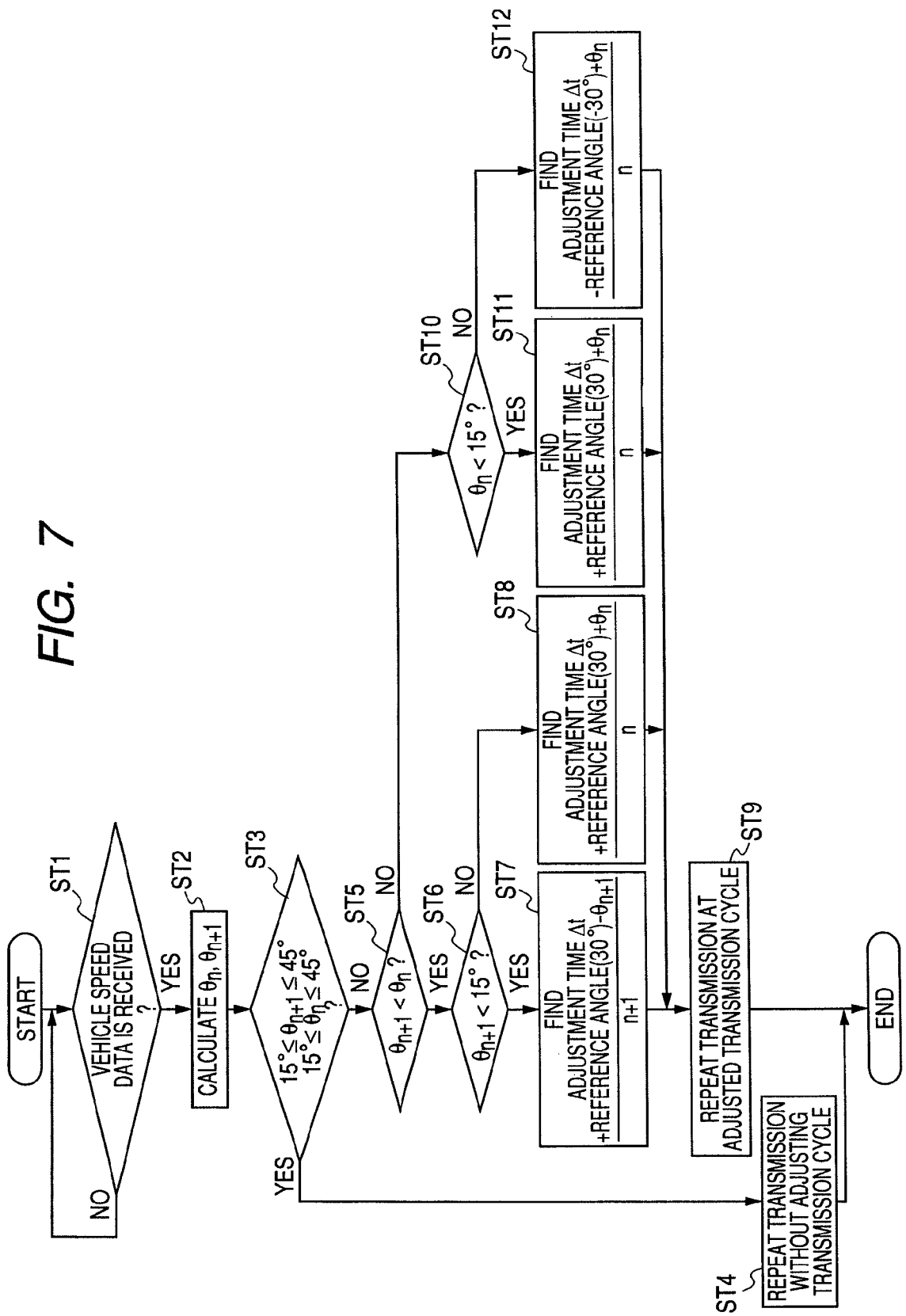
FIG. 7 is a flow chart for explaining the operation when the transmission cycle of an address electric wave is adjusted, in the tire state monitoring apparatus 1 according to Embodiment 1 of the invention.

FIG. 7 is a flow chart for explaining the operation when the transmission cycle of an address electric wave is adjusted, in the tire state monitoring apparatus 1 according to Embodiment 1 of the invention. For the convenience of description, a case where the ECU 5FL adjusts the transmission cycle of an address electric wave will be describe below. These kinds of processing are similarly performed even in the other ECU 5FR, 5RL, and 5RR.

As shown in FIG. 7, in the tire state monitoring apparatus 1 according to Embodiment 1, when the transmission cycle of an address electric wave, the master ECU 6 that has receives the vehicle speed data of the vehicle 2 from the speed detector 10 transmits a driving signal including the vehicle speed data to the ECU 5FL.

In the ECU 5FL, the reception of vehicle speed data (driving signal) from the master ECU 6 is monitored (step (hereinafter referred to as "ST"1). Here, if vehicle speed data has been received from the master ECU 6, the ECU 5FL estimates the (n+1)-th transmission timing and the n-th transmission timing according to the aforementioned points, and calculates the first evaluation angle ($\theta_{n+1}$) and the second evaluation angle ($\theta_n$) (ST2). On the other hand, if any vehicle speed data is not received, the monitoring operation of the vehicle speed data is continued.

In the ECU 5FL, the reception of vehicle speed data (driving signal) from the master ECU 6 is monitored (step (hereinafter referred to as "ST"1). Here, if vehicle speed data has been received from the master ECU 6, the ECU 5FL estimates the (n+1)-th transmission timing and the n-th transmission timing according to the aforementioned points, and calculates the first evaluation angle ($\theta_{n+1}$) and the second evaluation angle ($\theta_n$) (ST2). On the other hand, if any vehicle speed data is not received, the monitoring operation of the vehicle speed data is continued.

In contrast, if inequalities $15° \leq \theta_{n+1} \leq 45°$ and $15° \leq \theta_n \leq 45°$ is satisfied, that is, if both the (n+1)-th transmission timing and the n-th transmission timing do not fall within the reference angle ranges, the ECU 5FL proceeds to a step where the transmission timing of an address electric wave is adjusted. First, the magnitudes of the first evaluation angle ($\theta_{n+1}$) and the second evaluation angle ($\theta_n$) are compared with each other, the transmission timing having a smaller evaluation angle is determined as target transmission timing (ST5). As a result, if the first evaluation angle ($\theta_{n+1}$) is smaller, the (n+1)-th transmission timing is used as the target transmission timing, and which side of the + side reference angle range this target transmission timing is located is checked depending on the first evaluation angle ($\theta_{n+1}$) (ST6). As a result, if the first evaluation angle ($\theta_{n+1}$) is less than 15° and the target transmission timing is in the C region of FIG. 6, the target transmission timing, i.e., (n+1)-th transmission timing is used as the transmission timing to be adjusted, and adjustment time Δt is determined according to [Equation 6] (ST7).

$$\Delta t = \frac{+\text{reference\_angle}(30°) - \theta_{n+1}}{n+1} \cdot \frac{1}{\omega}[s] \quad \text{[Equation 6]}$$

In ST6, if the first evaluation angle ($\theta_{n+1}$) is not less than 15°, i.e., if the first evaluation angle ($\theta_{n+1}$) exceeds 45°, the target transmission timing is in the D region of FIG. 6. In this case, the n-th transmission timing is used as the transmission timing to be adjusted, and adjustment time Δt is determined according to [Equation 7] (ST8).

$$\Delta t = \frac{+\text{reference\_angle}(30°) + \theta_n}{n} \cdot \frac{1}{\omega}[s] \quad \text{[Equation 7]}$$

Transmission of an address electric wave is repeated at an adjusted transmission cycle obtained by adding the adjustment time Δt determined in ST7 or ST8 to a reference transmission cycle (ST9), and the next reception of vehicle speed data is prepared. If adjustment time is calculated in ST7 or ST8, an address electric wave obtained by reflecting this adjustment time in the transmission cycle of an address electric wave is transmitted (ST9). Specifically, an address electric wave is transmitted at an adjusted transmission cycle obtained by adding the calculated adjustment time to a reference transmission cycle of 20 ms. Thereafter, the processing is completed, and until a driving signal is received from the master ECU 6 after that processing, an address electric wave will be transmitted at the adjusted transmission cycle from the ECU 5FL.

In ST5, if the second evaluation angle ($\theta_n$) is smaller, the n-th transmission timing is used as target transmission timing, and which side of the – side reference angle range this target transmission timing is located is checked depending on the second evaluation angle ($\theta_n$) (ST10). As a result, if the second evaluation angle ($\theta_n$) is less than 15° and the target transmission timing is in the B region of FIG. 6, the (n+1)-th transmission timing is used as the transmission timing to be adjusted, and adjustment time Δt is determined according to [Equation 7] (ST11).

In ST10, if the second evaluation angle ($\theta_n$) is not less than 15°, i.e., if the second evaluation angle ($\theta_n$) exceeds 45(, the target transmission timing is in the A region of FIG. 6, the target transmission timing is used as the transmission timing to be adjusted, and adjustment time (t is determined according to [Equation 8] (ST12).

□EMBED Equation.3□ □ □ [Equation 8]

After the adjustment time is calculated in ST11 or ST12, the process proceeds to the aforementioned ST9.

As the feature of Embodiment 1, there is an advantage that a range in which a reference transmission cycle may not be adjusted becomes wide compared with an embodiment as will be described later by adopting two, i.e., + and – reference angle ranges. Further, since the transmission timing to be adjusted and the reference angles are determined by determining a position with respect to the reference range of target transmission timing, all the adjustment time becomes a plus value. Accordingly, since the adjustment transmission cycle necessarily becomes larger than the reference transmission cycle, it is not necessary to make the transmission capability of an apparatus highly advanced. Since one having a smaller evaluation angle, of the (n+1)-th transmission timing and the n-th transmission timing, is selected as target transmission timing that is a target for adjustment control, the adjustment time can be made smaller. Further, since two, i.e., + and − reference angles are adopted, and the transmission timing to be adjusted can be selected appropriately, the value of the adjustment time can be made smaller while the value of the adjustment time is kept plus.

If Embodiment 1 is applied to the above-described specific case shown in FIG. 5, the result is as follows. If the vehicle speed data that vehicle speed v is 168.6 km/h is received (ST1), the first evaluation angle ($\theta_{n+1}$) and the second evaluation angle ($\theta_n$) are calculated. As a result, $\theta_{n+1}=177°$ and $\theta_n=2°$ are obtained (ST2). Since it is confirmed in ST3 that the two evaluation angles do not fall within the reference angle ranges, the process proceeds to ST5. Since the second evaluation angle ((n) is smaller if the two evaluation angles are compared with each other in ST5, the process proceeds to ST10. Since the second evaluation angle ((n) is smaller than 15(, the process proceeds to ST11 where the adjustment time (t=0.00179 sec. i.e., 1.79 ms is obtained. Transmission of an address electric wave is started with the adjusted transmission cycle obtained by adding the adjustment time (t=1.79 ms to the reference transmission cycle 20 ms being 21.79 ms (ST9), and this step is repeated until the next vehicle data is received.

The transmission timing of an address electric wave in the above specific example will be described with reference to FIG. 10.

FIG. 10A shows the transmission timing of address electric waves before adjustment, and FIG. 10B shows the transmission timing of address electric waves after adjustment. In FIG. 10A, the transmission timing indicates angles of a tire, and the starting point (0°) of a transmission cycle is made to coincide with the start position of the communicable angle range (0° to 60°). This is because, under these conditions, the transmission timing with which communication can be made appears while being most delayed. Even in FIG. 10B, for the convenience of description, the same setting is made.

As shown in FIG. 10A, before the transmission cycle of address electric waves are adjusted, the transmission timing ($\theta_1$) of a first address electric wave is about 179°, and the transmission timing ($\theta_2$) of a second address electric wave is about 358°. Even in the transmission timing of third or more address electric waves, the address electric waves cannot be transmitted to the communicable angle range.

In contrast, as shown in FIG. 10B, in a case where an address electric wave is transmitted at an adjusted transmission cycle of 21.79 ms as the transmission cycle of the address electric wave, the transmission timing ($\theta_2$) of a second (n-th) address electric wave is adjusted to 330°. As a result, after the second transmission timing, the transmission time that has moves by every 30° that is an adjustment angle appears. As a result, while a tire make twelve rotations, the transmission timing appears at intervals of 30° in a range in which one round of the tire is covered. Accordingly, irrespective of where a communicable angle range having a range of 60° is located, communication is established during twelve rotations of the tire. Actually, since transmission timings that move by an adjustment angle with coexist with ($\theta_1$) at the head.

Embodiment 2

Figure 8:
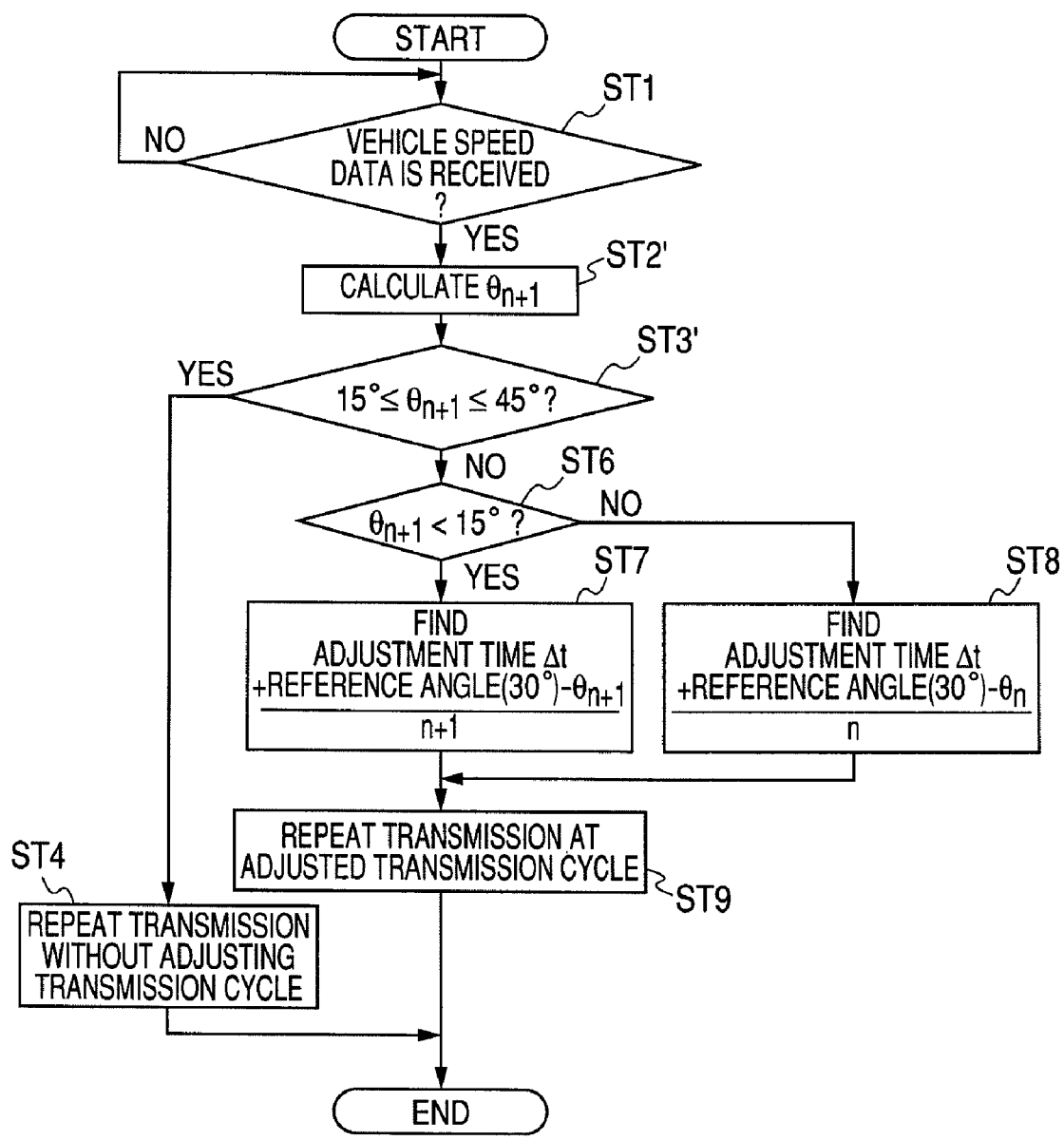
FIG. 8 is a flow chart for explaining the operation when the transmission cycle of an address electric wave in Embodiment 2 of the invention is adjusted.

Next, the tire state monitoring apparatus 1 according to Embodiment 2 of the invention will be described. FIG. 8 is a flow chart for explaining the operation when the transmission cycle of an address electric wave in Embodiment 2 of the invention is adjusted.

Embodiment 2 is obtained by simplifying some of the steps in the aforementioned Embodiment 1. This simplification is performed by determining target transmission timing in advance in the (n+1)-th transmission timing. That is, compared with the flow chart of the aforementioned Embodiment 1 shown in FIG. 7, only the first evaluation angle ($\theta_{n+1}$) is determined in ST2' (corresponding to ST2). Also, in ST3' (corresponding to ST3), the first evaluation angle ($\theta_{n+1}$) is evaluated and only whether or not the (n+1)-th transmission timing falls within the reference angle ranges is evaluated. Thereby, although there is a drawback in that a range in which the transmission cycle may not be adjusted becomes narrower compared with Embodiment 1, there is also an advantage in that the processing of determination becomes simple. Since the steps after ST6 are the same as those of Embodiment 1, and the (n+1)-th transmission timing and the n-th transmission timing are selected as the transmission timing to be adjusted, it is possible to obtain almost the same effects as Embodiment 1 excluding under special conditions, as well as the adjustment time becomes a + value. Incidentally, if the above-described specific example shown in FIG. 5 is applie3d to the second embodiment, the same results as Embodiments are obtained.

Embodiment 3

Figure 9:
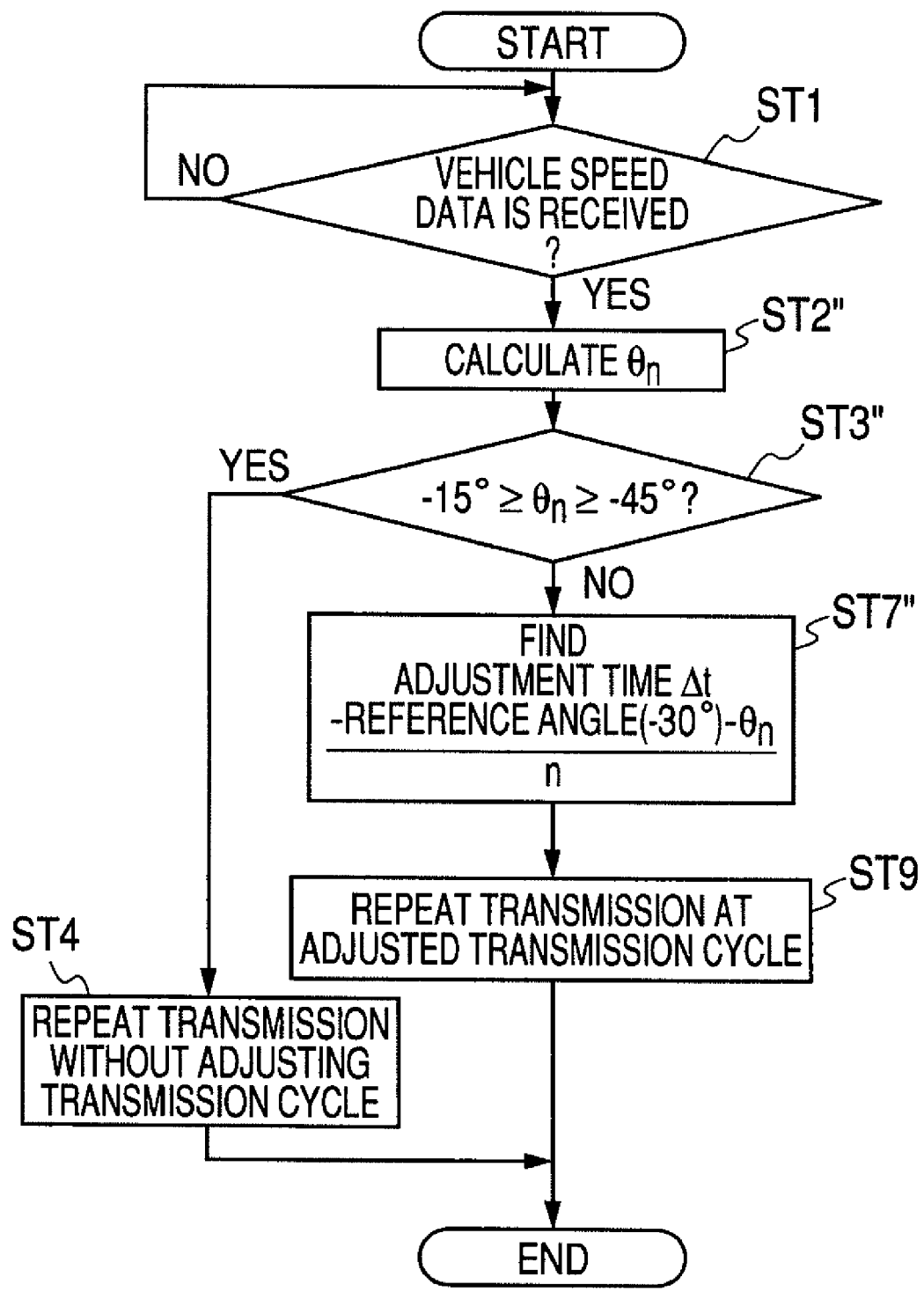
FIG. 9 is a flow chart for explaining the operation when the transmission cycle of an address electric wave in Embodiment 3 of the invention is adjusted.

Next, a tire state monitoring apparatus 1 according to Embodiment 1 of the invention. FIG. 9 is a flow chart for explaining the operation when the transmission cycle of an address electric wave in Embodiment 3 of the invention is adjusted.

In Embodiment 3, for the purpose of simplifying some of steps similarly to the aforementioned Embodiment 2, contrary to Embodiment 2, the target transmission timing is determined to the n-th transmission timing in advance. That is, compared with the flow chart of the aforementioned Embodiment 1 shown in FIG. 7, only the second evaluation angle ($\theta_n$) is determined in ST2" (corresponding to ST2). Also, in ST3" (corresponding to ST3), the second evaluation angle ($\theta_n$) is evaluated and only whether or not the n-th transmission timing falls within the reference angle ranges is evaluated. Further, Embodiment 3 is different from the aforementioned Embodiments 1 and 2 in that the transmission timing to be adjusted is fixed to the n-th transmission timing. That is, there is no step corresponding to ST6, and if the n-th transmission timing, i.e., target transmission timing does not fall within the reference angle ranges, adjustment time is determined so that the target transmission timing may be conformed to a reference angle (ST"). As a result, there is a possibility that the adjustment time may become a minus value. However, such a case is only when the target transmission timing, i.e., n-th transmission timing is between 0° and −15°, and is not large in frequency. Further, since this is sufficiently allowable processing if the ability of an apparatus is high, its adoption is possible.

As described above, according to the tire state monitoring apparatus 1 according to the present embodiments, the ECUs 5FL to 5RR are adapted to adjust the transmission cycle of an address electric wave so that the address electric wave can be transmitted within the communicable range of the transponders 4FL to 4RR. Therefore, unlike the conventional tire state monitoring apparatus, it is possible to prevent the transmission cycle of an address electric wave from being sharply increased according to vehicle speed, and it becomes unnecessary to mount a processor capable of coping with high-speed processing. As a result, while the cost required for manufacture of a main body of an apparatus can be reduced, it is possible to properly monitor the state of tires even in a case where the speed of a vehicle is high. In particular, according to the tire state monitoring apparatus 1 according to the present embodiments, the transmission timing of an address electric wave is adjusted according to vehicle speed, it is possible to properly monitor the state of tires while coping with vehicle speed flexibly.

In addition, the invention is not limited to above embodiments, and various changes can be made thereto. In the above embodiments, the sizes or shapes shown in the accompanying drawings are not limited, but can be properly changed within the range in which the effects of the invention can be exhibited. In addition, proper changes can be made without departing from the scope of the purpose of the invention.

According to this tire state monitoring apparatus, a controller transmits an address electric wave at a predetermined transmission cycle, estimates transmission timing according to the speed of the vehicle, and adjusts the transmission cycle of the address electric wave only when the transmission cycle does not satisfy a predetermined condition. Therefore, unlike the conventional tire state monitoring apparatus, it is possible to avoid a situation where the number of times of transmission of address electric waves is rapidly increased uniformly according to vehicle speed, and it becomes unnecessary to mount a processor capable of coping with high speed processing. As a result, it is possible to properly monitor the state of a tire even if the speed of a vehicle becomes high, while reducing the cost required for manufacture of an apparatus body In the above tire state monitoring apparatus, the predetermined condition is such that target transmission timing that is transmission timing directly before or directly after one rotation of the tire from the starting point of the transmission cycle is located within a prescribed reference angle range. That is, the fact that an angle (hereinafter referred to as evaluation angle) that is formed between the starting point of the transmission cycle and the target transmission timing is located within a prescribed reference angle range is set as a predetermined condition. If this condition is satisfied, the evaluation angle becomes the movement angle, or the angle between transmission timings, i.e., the relation between the transmission cycle and the movement angle becomes proper. As a result, the transmission timing can be located within the communicable range necessarily once while the tire makes a plurality of rotations. Accordingly, in this case, if an address electric wave is transmitted at a predetermined transmission cycle, communication is established.

For example, in the above tire state monitoring apparatus, the prescribed reference angle is set to an angle position that is narrower than a communicable angle range that sandwiches a reference position of almost a half angle position of the communicable angle range. Accordingly, since the movement angle is set to the center of the communicable angle range excluding both ends thereof, the possibility that the transmission timing falls within the communicable range by a plurality of rotations of a tire will increase.

Further, in the above tire state monitoring apparatus, the controller adjusts the predetermined transmission cycle so as to move the target transmission timing to the reference position, if the target transmission timing does not satisfy the predetermined condition as a result of estimation of the transmission timing. Accordingly, since address electric waves are transmitted at a transmission cycle after adjustment, and the movement angle at this time becomes an angle between the starting point of the transmission cycle and the reference position, i.e., almost a half angle of the communicable angle range, the possibility that the transmission timing falls within the communicable angle range while a tire makes a plurality of rotations becomes highest.

Further, in the above tire state monitoring apparatus, it is preferable that the target transmission timing is first transmission timing when one rotation of the tire has been exceeded, and the reference position is located in the + direction from the starting point of the transmission cycle, and it is also preferable that, if the target transmission timing has not reached the reference angle range, the transmission cycle is adjusted so that the target transmission timing may be moved to the reference position, and if the target transmission timing exceeds the reference angle range, the transmission cycle is adjusted so that the transmission timing before the target transmission timing may be moved to the reference position. According to this configuration, since the transmission cycle after adjustment becomes larger than the predetermined transmission cycle, it is not necessary to mount a processor capable of coping with high-speed processing by becoming smaller than a predetermined transmission cycle.

Further, in the above tire state monitoring apparatus, the target transmission timing can be first transmission timing immediately before one rotation of the tire has been exceeded, and the reference position can be located in the − direction from the starting point of the transmission cycle. In this case, although the estimated position of the target transmission timing differs, there are the same effects as the above.

The invention claimed is:

1. A tire state monitoring apparatus comprising:
a transponder mounted on a tire on a vehicle; and
a controller provided on a vehicle body to repeatedly transmit an address electric wave that acquires data showing a tire state to the transponder,
wherein the controller transmits the address electric wave at a predetermined transmission cycle to the transponder, estimates the transmission timing of the address electric wave at the predetermined transmission cycle according to a vehicle speed, maintains the predetermined transmission cycle if the estimated transmission timing satisfies a predetermined condition, and adjusts the predetermined transmission cycle if the transmission timing does not satisfy the predetermined condition wherein the transmission timing is calculated on the basis of a starting point of a transmission cycle, and the predetermined condition is such that target transmission timing that is transmission timing directly before or directly after one rotation of the tire in the calculated transmission timing is located within a prescribed reference angle range.

2. The tire state monitoring apparatus according to claim 1, wherein a communicable angle range within which the transmission and reception of the address electric wave from the controller to the transponder is allowed exists, and the prescribed reference angle range is a range that sandwiches a reference position located at an angle at which the communicable range is divided into almost half angles from the starting point of the transmission cycle, and is narrower than the communicable angle range.

3. The tire state monitoring apparatus according to claim 1, wherein the controller adjusts the predetermined transmission cycle so as to move the target transmission timing to the reference position, if the target transmission timing does not satisfy the predetermined condition.

4. The tire state monitoring apparatus according to claim 3, wherein the target transmission timing is first transmission timing when one rotation of the tire has been exceeded, and the reference position is located in the + direction from the starting point of the transmission cycle.

5. The tire state monitoring apparatus according to claim 3, wherein the target transmission timing is first transmission timing immediately before one rotation of the tire has been exceeded, and the reference position is located in the — direction from the starting point of the transmission cycle.

6. The tire state monitoring apparatus according to claim 3, wherein the target transmission timing is first transmission timing when one rotation of the tire has been exceeded, and wherein, if the target transmission timing has not reached the reference angle range located in the + direction from the starting point of the transmission cycle, the predetermined transmission cycle is adjusted so that the target transmission timing may be moved to the reference position, and if the target transmission timing exceeds the reference angle range, the predetermined transmission cycle is adjusted so that the transmission timing before the target transmission timing may be moved to the reference position.

* * * * *